United States Patent [19]

Kuijk

[11] Patent Number: 5,032,831

[45] Date of Patent: * Jul. 16, 1991

[54] DISPLAY DEVICE AND METHOD OF DRIVING SUCH A DEVICE

[75] Inventor: Karel E. Kuijk, Eindhoven, Netherlands

[73] Assignee: U.S. Philips Corporation, New York, N.Y.

[*] Notice: The portion of the term of this patent subsequent to Jul. 24, 2007 has been disclaimed.

[21] Appl. No.: 208,185

[22] Filed: Jun. 16, 1988

[30] Foreign Application Priority Data

Jun. 18, 1987 [NL] Netherlands ............... 8701420

[51] Int. Cl.$^5$ ............................. G09G 3/36
[52] U.S. Cl. ........................ 340/784; 340/805; 350/333
[58] Field of Search ............... 340/784, 805, 719, 765; 350/333, 334; 358/230

[56] References Cited

U.S. PATENT DOCUMENTS

| 3,532,813 | 10/1970 | Lechner | 358/230 |
| 4,393,380 | 7/1983 | Hosokawa et al. | 350/334 |
| 4,583,087 | 4/1986 | Van de Venne | 340/719 |
| 4,641,135 | 2/1987 | Hilbrink | 340/784 |
| 4,709,992 | 12/1987 | Ueno | 350/333 |
| 4,715,685 | 12/1987 | Yaniv et al. | 350/333 |
| 4,748,445 | 5/1988 | Togashi et al. | 340/784 |
| 4,794,385 | 12/1988 | Kuijk | 340/719 |
| 4,810,059 | 3/1989 | Kuijk | 350/333 |
| 4,811,006 | 3/1989 | Kuijk | 340/719 |

Primary Examiner—Jeffery A. Brier
Assistant Examiner—M. Fatahi Yar
Attorney, Agent, or Firm—John C. Fox

[57] ABSTRACT

In a picture display device driven with an active matrix the voltage across the pixels (12) is accurately adjusted by discharging or charging the associated capacitances, if necessary, first to beyond the transition range (17) in the transmission/voltage characteristic.

35 Claims, 5 Drawing Sheets

DISPLAY DEVICE AND METHOD OF DRIVING SUCH A DEVICE

BACKGROUND OF THE INVENTION

The invention relates to a display device comprising an electro-optical display medium between two supporting plates, a system of pixels arranged in rows and columns, with each pixel being formed by picture electrodes arranged on the facing surfaces of the supporting plates, and a system of row and column electrodes for presenting selection and data signals by means of which a range of voltages dependent on the electro-optical display medium can be presented across the pixels for the purpose of picture display.

The invention also relates to a method of driving such a display device.

A display device of this type is suitable for displaying alphanumerical information and video information by means of passive electro-optical display media such as liquid crystals, electrophoretic suspension and electrochromic materials.

A display device of the type described in the opening paragraph is known from U.S. Pat. No. 4,811,006, in the name of the Applicant. In the device shown in this Application diodes are used as non-linear switching elements in an active matrix, namely two diodes per pixel. Two successive rows of pixels each time have one row electrode in common. The drive mode is such that in television applications (for example with a drive mode in accordance with the PAL or NTSC system) the information of two successive even and odd lines is presented across each pixel at an alternating polarity and at the field frequency. The information of a pixel row is therefore determined by the average signal of two successive even and odd lines. Since each time two rows of picture electrodes are simultaneously written because two successive rows each time have one row electrode in common, such a device provides little flexibility as regards the choice of colour filters to be used. In fact, this choice is limited to strip-shaped colour filters.

OBJECTS AND SUMMARY OF THE INVENTION

It is an object of the invention to provide a picture display device of the type described in the opening paragraph in which the rows of pixels are separately driven without an increase of the number of connections.

It is also an object of the invention to provide such a display device ensuring a considerable freedom in the choice of the colour filters to be used.

The invention is based on the recognition that it is possible to give the pixels a given adjustment per row by charging or discharging the capacitances associated with these pixels after first having discharged or charged them too far (whether or not accurately).

To this end a picture display device according to the invention is characterized in that the device comprises means to apply, prior to selection, an auxiliary voltage across the pixels beyond or on the limit of the voltage range to be used for picture display.

The auxiliary voltage is preferably beyond or on the limit of the range of transition in the transmission/voltage characteristic of the electro-optical medium.

A first preferred embodiment of a display device according to the invention is characterized in that the picture electrode on one of the supporting plates is connected in an electrically conducting manner to the common point of two non-linear switching elements which are arranged in series between a column electrode for data signals and an electrode for the auxiliary voltage.

The auxiliary voltage may then be a fixed reference voltage so that all pixels in a row are first charged negatively or positively to a fixed value and are subsequently charged or discharged to the correct signal value, dependent on the data signals presented.

Since this is effected for each individual row without a subsequent row or previous row being influenced, the picture information can be adapted to a colour filter to be used, which colour filter may be composed of, for example, triplets as described, for example, U.S. Pat. No. 4,908,609 in the name of the Applicant, or it may have, for example a diagonal structure.

Discharging and charging prior to the actual driving operation with the picture information can be effected during the same line period in which the picture information is presented, but also during the preceding line period.

Since each row of pixels is now separately written, the voltage across these pixels can also be inverted per row, which leads to a higher face flicker frequency and hence to a steadier picture.

A second preferred embodiment of a device according to the invention is characterized in that a Zener diode is arranged between a pixel and a row or column electrode. In this case the electrode for the reference voltage may be entirely dispensed with, which leads to a relatively larger portion of the surface of the pixel to be used for the actual display. In addition the number of components in such a device is smaller, which increases the yield manufacturing. Finally the parasitic capacitance is smaller, so that a wider choice of electro-optical materials and the Zener diode to be used is possible.

A method according to the invention is characterized in that prior to presenting a data signal, the pixels are charged positively or negatively to an auxiliary voltage beyond or on the limit of the range to be used for picture display.

BRIEF DESCRIPTION OF THE DRAWINGS

The invention will now be described in greater detail by way of example with reference to the accompanying drawings in which

FIG. 6 is a diagrammatic schematic representation showing a modification of the device of FIG. 4a;

The Figures are diagrammatic and not to scale. Corresponding components are usually denoted by the same reference numerals.

DESCRIPTION OF THE PREFERRED EMBODIMENTS

Figure 1:
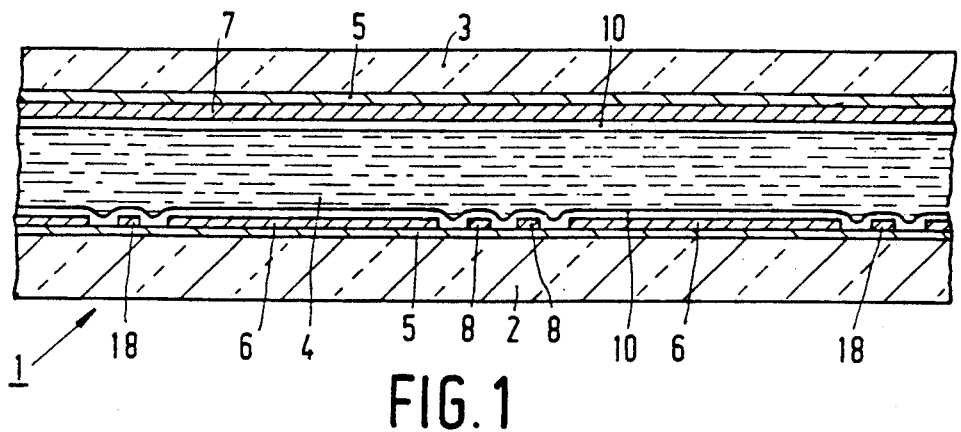
FIG. 1 is a diagrammatic cross-section of a portion of a display device according to the invention, taken on the line I—I in FIG. 2.
Figure 2:
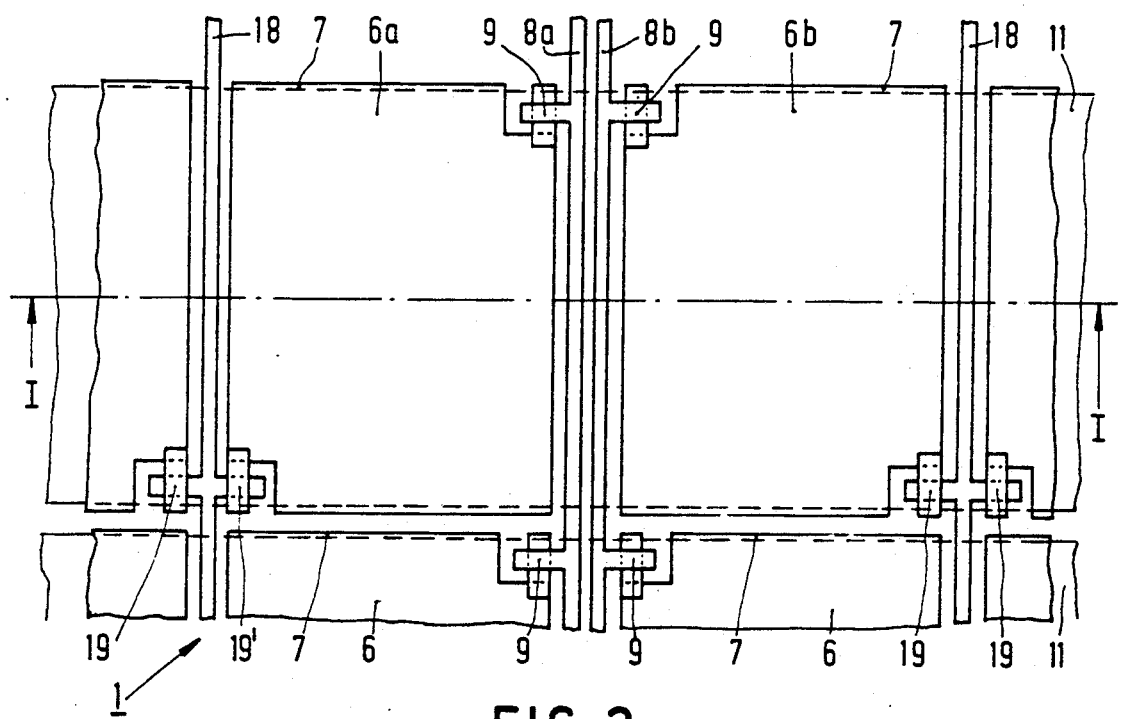
FIG. 2 is a diagrammatic plan view of the device of FIG. 1.

FIGS. 1 and 2 show a diagrammatic cross-section and a plan view of a part of a display device, in this embodiment a liquid crystal display device, which has two supporting plates 2 and 3, between which, for example a twisted nematic or a ferro-electric liquid crystalline material 4 is present. The inner surfaces of the supporting plates 2 and 3 have electrically and chemically insulating layers 5. A plurality of row and column-arranged picture electrodes 6 of indium tin oxide or another electrically conducting transparent material is provided on the supporting plate 2. Likewise, transparent picture electrodes 7 of, for example, indium tin oxide which are integrated to form strip-shaped row electrodes 11, are provided on the supporting plate 3. The facing picture electrodes 6, 7 constitute the pixels of the display device.

Strip-shaped column electrodes 8 are arranged between the columns of picture electrodes 6. Each picture electrode 6 is connected to a column electrode 8 by a diode 9 diagrammatically shown in FIG. 2. As is apparent from FIG. 2, the associated column electrodes 8a, 8b are provided between two picture electrodes 6a, 6b. Furthermore, liquid crystal orientating layers 10 are provided on the inner surfaces of the supporting plates 2 and 3 over the various electrodes. As is known, another orientation state of the liquid crystal molecules and hence an optically different state can be obtained by applying a voltage across the liquid crystal layer 4. As is known, the display device may be realised as a transmissive or a reflective device and may be provided with two or one polarisers respectively, for this purpose.

According to the invention, auxiliary electrodes 18 are common to two columns of picture electrodes 6 on the side of the picture electrodes 6 different from that of the column electrodes 8. The auxiliary electrodes 18 connect the picture electrodes 6 to a reference voltage via diodes 19, which diodes are diagrammatically shown in FIG. 2. This reference voltage is chosen to be such that, dependent on the voltages used on the selection line 11 and the electro-optical material used, the capacitance associated with the pixel can always be discharged via the diode 19 to a voltage value beyond or on the limit of the range of transition in the transmission voltage characteristic of the relevant electro-optical material.

Figure 3:
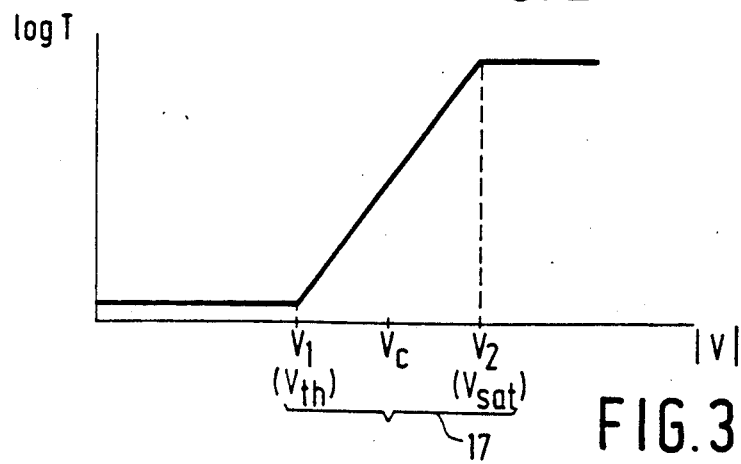
FIG. 3 shows graphically the associated transmission-voltage characteristic of a display cell of the device of FIGS. 1 and 2.

FIG. 3 shows diagrammatically a transmission/voltage characteristic of a display cell as it occurs in the display device of FIG. 1, 2. Below a given threshold voltage ($V_1$ or $V_{th}$) the cell substantially passes no light, whereas above a given saturation voltage ($V_2$ or $V_{sat}$) the cell is substantially entirely transparent. The intermediate range constitutes the above-mentioned range of transition and is indicated in FIG. 3 by bracket 17. In this respect it is to be noted that the absolute value of the voltage is plotted on the abscissa, because such cells are usually driven at an alternating voltage.

Figure 4:
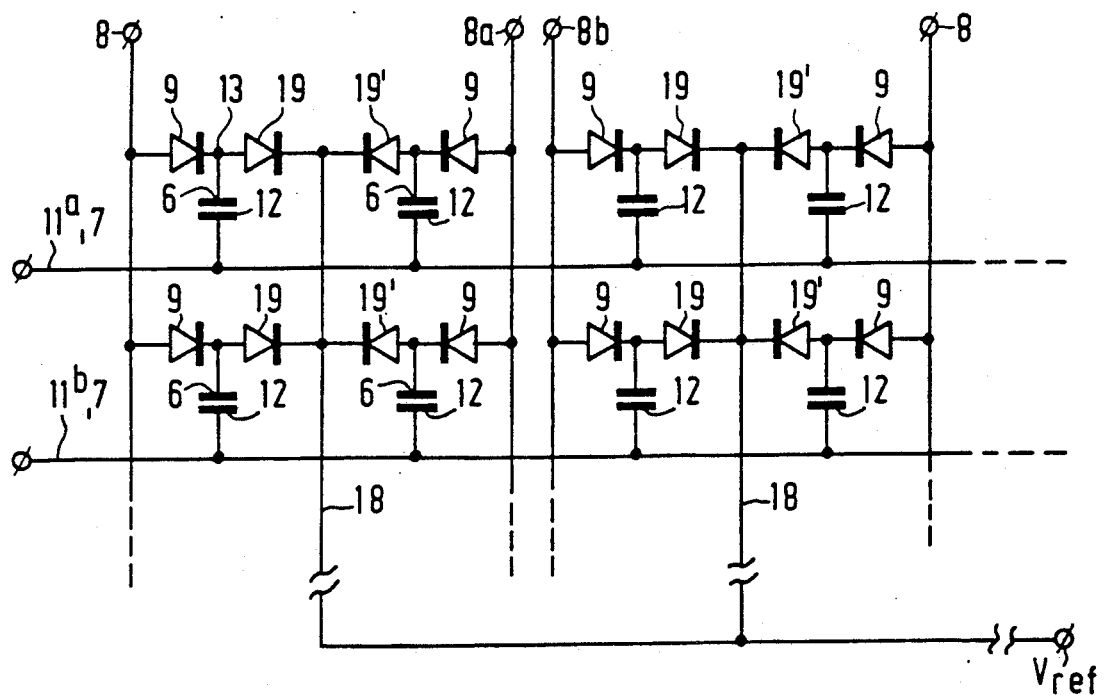
FIGS. 4a and 4b are diagrammatic schematic representations of two devices of the type shown in FIGS. 1 and 2.
Figure 4A:
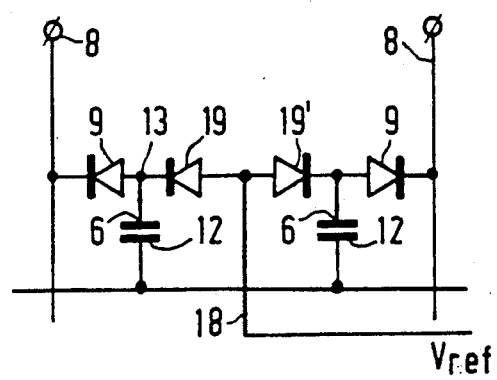

FIG. 4a shows diagrammatically a schematic of part of a display device of the type shown in FIGS. 1, 2. Pixels 12 constituted by facing picture electrodes 6, 7 are connected via the picture electrodes 7 to row electrodes 11 at one end, which together with the column electrodes 8 are arranged in the form of a matrix. The pixels 12 are connected to column electrodes 8 via diodes 9. They are also connected via diodes 19 to an auxiliary electrode 18, which each time is common to two diodes 19, 19'.

For writing information, a first selection/voltage $V_{s1}$ is presented on a selection line 11 during a selection period $t_s$ while the information or data voltages $V_d$ are simultaneously presented on the column electrodes 8; this leads to a positive voltage across a pixel 12, which represents the information presented.

To prevent degradation of the liquid crystal and to be able to increase the so-called face flicker frequency, information having an alternating sign is preferably presented across the pixel 12. In a device according to the invention a negative voltage across the pixel 12, which represents the information presented, is achieved by presenting a second selection voltage $V_{s2}$ while simultaneously presenting inverted data voltages ($-V_d$), after having discharged the capacitance associated with the pixel 12 too far (or after having negatively charged it too far).

Figure 5A:
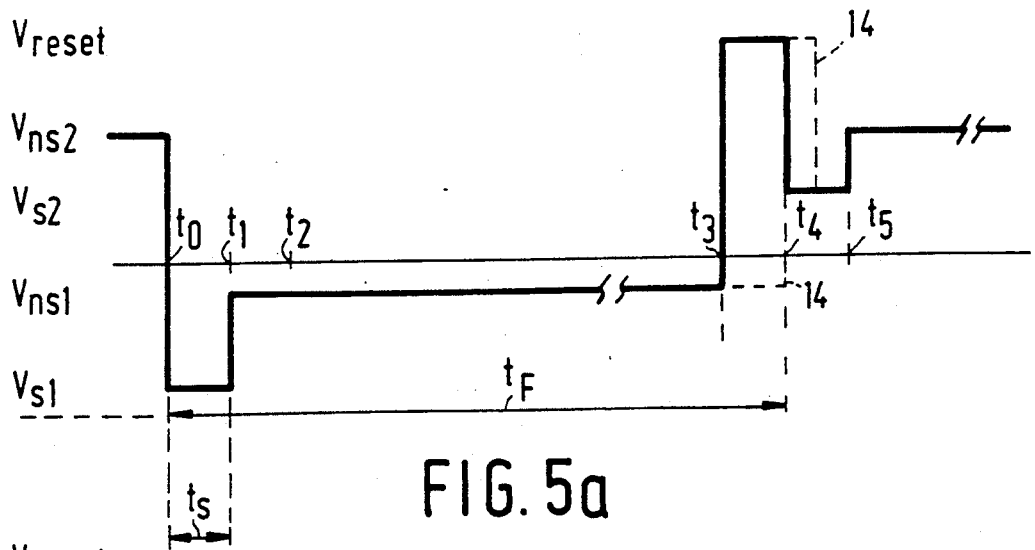
FIGS. 5a–5c show graphically some drive signals appropriate for use with the devices of the invention.
Figure 5B:
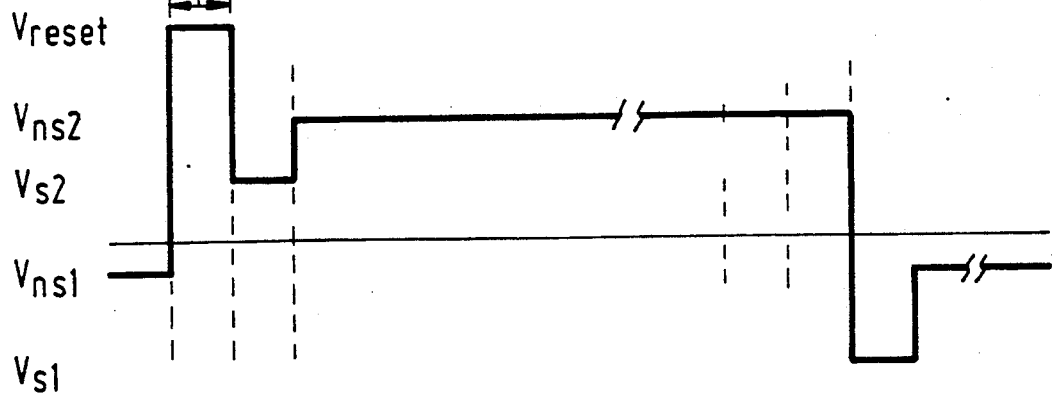
Figure 5C:
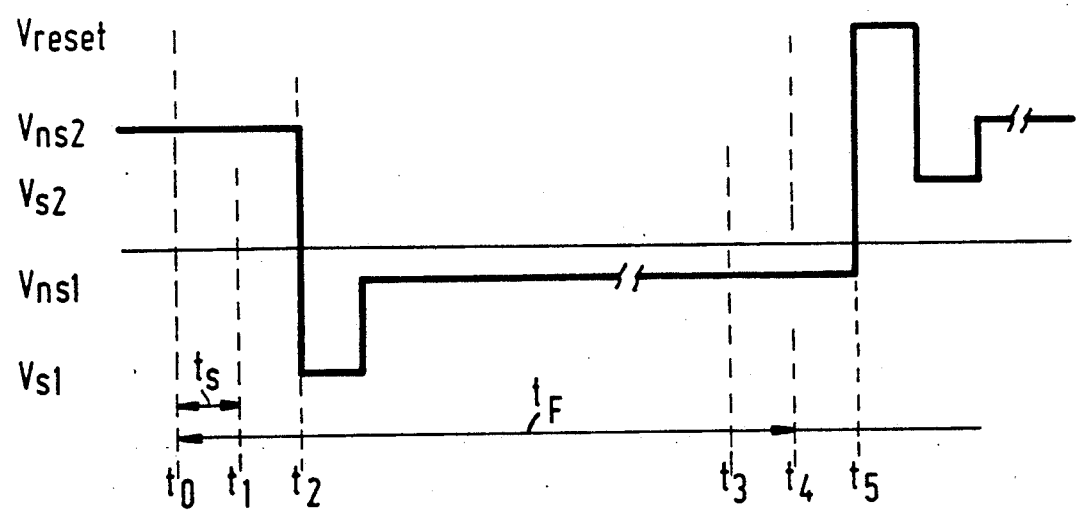

FIGS. 5a–5c show how the drive signals are chosen for a plurality of rows of pixels 12 in order to write them with picture information which changes sign during each field (for example in TV applications).

From the instant $t_0$ (see FIG. 5a) a selection voltage $V_{s1}$ is presented on a row electrode 11 during a selection period $t_s$ (which in this example is chosen to be equal to a line period for TV applications, namely 64 /μsec) while information voltages or data voltages $V_d$ are simultaneously presented on the column electrodes 8. After the instant $t_1$ the row of pixels 12 is no longer selected because the row electrode 11 receives a voltage $V_{ns1}$. This voltage is maintained until just before the next selection of the row of pixels 12. In this example this is effected by giving the selection line 11 a reset voltage just before again selecting the first row of pixels 12, namely at an instant $t_3 = t_f - t_s$ in which $t_f$ represents a field period. The reset voltage and a reference voltage presented on the common point of the diodes 9, 19' can then be chosen to be such that the pixels 12 are charged negatively to such an extend that this voltage lies beyond the range to be used for picture display (up to a value of $\leq -V_{sat}$). In a subsequent selection period (from $t_4$), they are then charged to the desired value determined by data voltages $-V_d$. To this end the row electrodes receive the voltage $V_{s2}$ and after the selection period (after $t_5$) has elapsed they receive a non-selection voltage $V_{ns2}$. In this way the voltage across the pixels in inverted during each field period.

FIG. 5b shows the same voltage variation as FIG. 5a but shifted over a field period plus a selection period (in this case a line period). This provides the possibility of writing two successive rows of pixels with inverse data voltages with respect to each other. FIG. 5c is identical to FIG. 5a, but is shifted over the selection periods.

For (television) pictures with half the vertical resolution in which the lines of the even and the odd field are written over each other it is achieved that the picture information changes its sign and is replenished once per field period. Although the line flicker frequency is 25 Hz (30 Hz) in this case, a face flicker frequency of 50 Hz (60 Hz) is achieved between successive rows due to the phase difference of 180° introduced by changing the sign per row.

The selection voltages $V_{s1}$ and $V_{s2}$ may of course also be chosen to be shorter than one line period (64 μsec). In this case the reset voltage may alternatively be presented during a part of the line period in which selection takes place provided there is sufficient time left to charge the pixels 12. The voltage variation on the electrodes 11 is then effected, for example, in the way as shown diagrammatically in FIG. 5a by means of the broken line 14.

The device shown is very suitable for using a drive method in which $$V_c = \frac{V_{sat} + V_{th}}{2}$$

is chosen for the average voltage across a pixel (see FIG. 3) so that the absolute value of the voltage for the purpose of picture display across the pixels 12 is substantially limited to the range between $V_{th}$ and $V_{sat}$.

A satisfactory operation as regards grey scales is obtained if, dependent on the data voltages $V_d$ on the column electrodes 8, the voltage values across the pixels 12 are at most $V_c+V_{dmax}=V_{sat}$ and at least $V_c-V_{dmax}=V_{th}$. Elimination of $V_c$ yields: $|V_d|max=\frac{1}{2}(V_{sat}-V_{th})$, that is to say $-\frac{1}{2}(V_{sat}-V_{th})\leq V_{dmax}\leq \frac{1}{2}(V_{sat}-V_{th})$.

In order to charge a row of pixels 12, for example, positively, the associated row electrode 11 is given a selection voltage $V_{s1}=-V_{on}-\frac{1}{2}(V_{sat}+V_{th})$ in which $V_{on}$ is the forward voltage of the diode 9. The voltage across the pixel 12 is therefore $V_d-V_{on}-V_{s1}$; it ranges between $-\frac{1}{2}(V_{sat}-V_{th})+\frac{1}{2}(V_{sat}+V_{th})=V_{th}$ and $\frac{1}{2}(V_{sat}-V_{th})+\frac{1}{2}(V_{sat}+V_{th})=V_{sat}$ dependent on $V_d$.

In order to negatively charge the same row of pixels 12 (in a subsequent field or frame period) at a subsequent selection with inverted data voltages, these are first charged negatively too far by means of a reset voltage $V_{reset}$ on the row electrode 11 via diodes 19 connected to a reference voltage. Subsequently the selected row electrode receives a selection voltage $V_{s2}=-V_{on}+\frac{1}{2}(V_{sat}+V_{th})$ (in the same line period or in a subsequent period). The pixels 12 which are negatively charged too far are now charged via the diodes 9 to $V_d-V_{on}-V_{s2}$, that is to say to values between $-\frac{1}{2}(V_{sat}-V_{th})-\frac{1}{2}(V_{sat}-V_{th})=-V_{sat}$ and $\frac{1}{2}(V_{sat}-V_{th})-\frac{1}{2}(V_{sat}-V_{th})=-V_{th}$ so that information with the opposite sign is presented across the pixels 12.

In the case of non-selection, the requirement must be satisfied that neither diodes 9 nor diodes 19 can conduct, in other words for the voltage $V_A$ at the junction point 13 it must hold that $V_A \geq V_d$ and $V_A \leq V_{ref}$ or $V_{Amin} \geq V_{Dmax}$ (1) and $V_{Amax} \leq V_{ref}$(2). For the lowest non-selection voltage $V_{ns1}$ it then holds that:

$$V_{Amin}=V_{ns1}+V_{th}V_{Dmax}=\frac{1}{2}(V_{sat}-V_{th}),\quad (1)$$

or $$V_{ns1}\geq \frac{1}{2}(V_{sat}-V_{th})-V_{th} \quad (3)$$

It follows from (2) that $$V_{ns1}+V_{sat}\leq V_{ref} \text{ or } V_{ns1}\leq V_{ref}-V_{sat} \quad (4)$$

Combination of (3) and (4) yields $$V_{ref}-V_{sat}\geq V_{ns1}\geq \frac{1}{2}(V_{sat}-V_{th})-V_{th}$$

$$V_{ref}\geq 3/2(V_{sat}-V_{th}) \quad (5)$$

For the highest non-selection voltage $V_{ns2}$ it similarly holds that:

$$V_{Amin}=V_{ns2}-V_{sat}\geq \frac{1}{2}(V_{sat}-V_{th}) \text{ or} \quad (4')$$

$$V_{ns2}\geq \frac{1}{2}(V_{sat}-V_{th})+V_{sat}(3') \text{ and}$$

$$V_{ns2}-V_{th}\leq V_{ref} \text{ or } V_{ns2}\leq V_{ref}+V_{th}$$

Combination of (3') and (4') yields;

$$V_{ref}+V_{th}\geq V_{ns2}\geq \frac{1}{2}(V_{sat}-V_{th})+V_{sat} \text{ or} \quad (5)$$

$$V_{ref}\geq 3/2(V_{sat}-V_{th}).$$

The reference voltage $3/2(V_{sat}-V_{th})$ thus suffices to block the diodes 19, 19' after writing both data and inversed data by the method described above. In summary it holds for the voltages $V_{ns}$, $V_s$, $V_{ref}$ and $V_{reset}$ that:

$$V_{s1}=-V_{on}-\frac{1}{2}(V_{sat}+V_{th});$$

$$V_{s2}=-V_{on}+\frac{1}{2}(V_{sat}+V_{th});$$

$$V_{ns1}=\frac{1}{2}(V_{sat}-V_{th})-V_{th};$$

$$V_{ns2}=\frac{1}{2}(V_{sat}-V_{th})+V_{sat};$$

$$V_{ref}=3/2(V_{sat}-V_{th});$$

$$V_{res}=V_{on}+5/2V_{sat}-3/2V_{th}.$$

When reversing the sign of the diodes 9, 19 as it diagrammatically shown in FIG. 4a, the same type of drive mode may be used. Similar relations, be it with reversed sign, then apply to the drive signals.

Figure 6:
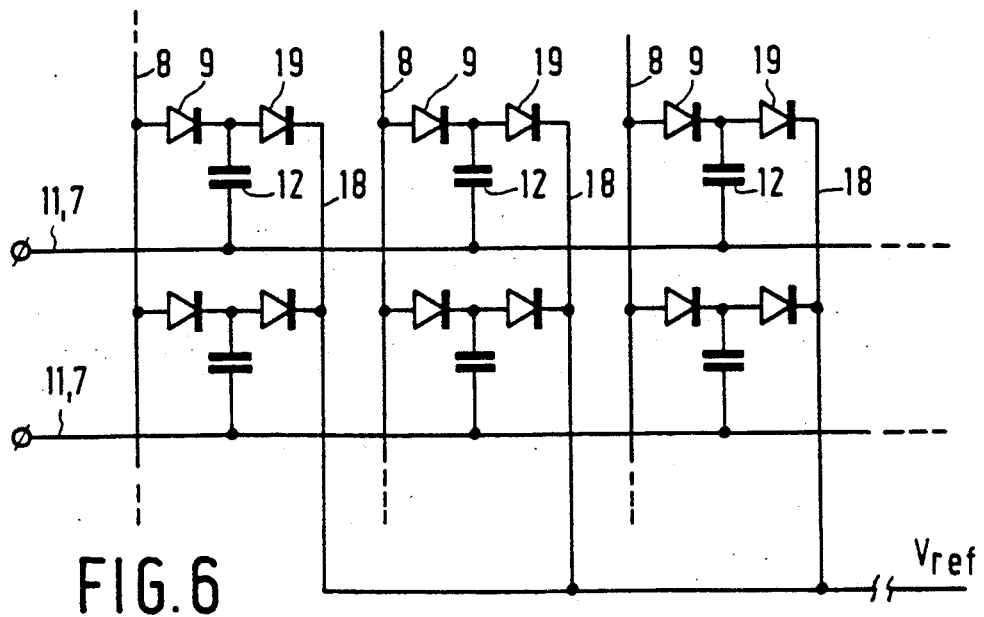

FIG. 6 shows diagrammatically a modification of the device of FIG. 4. Since per column of pixels both a column electrode 8 and auxiliary electrode 18 is present, such a realisation is at the expense of surface area which may otherwise be utilised for picture electrodes. Otherwise the reference numerals have the same significance as in the previous embodiment. The drive mode is also identical.

As has been stated, the advantage of a device and a method according to the invention is that each row of pixels can be separately driven without extra connection lines being required and with a free choice as regards the colour filters to be used.

Figure 7:
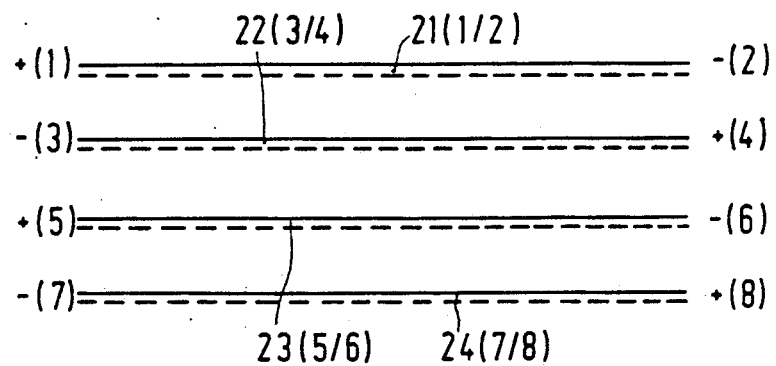
FIGS. 7 and 8 show diagrammatically two methods by which a device according to the invention may be used for television display.
Figure 8:
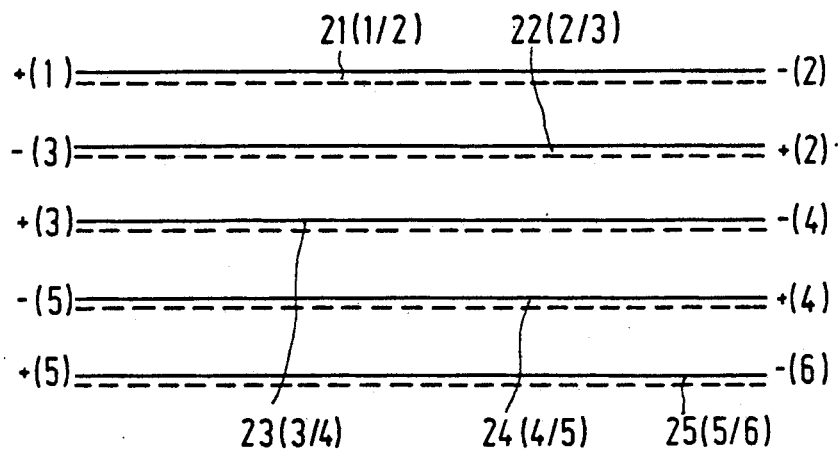

It has been described hereinbefore how the information can be alternately reversed in sign for lines to be written under a simultaneous inversion of the selection voltages. The voltage across the pixel is inverted. FIGS. 7 and 8 show examples thereof.

In these examples, subsequent picture lines are denoted from the top to the bottom by means of the numerals 1,2,3 ... 575 (PAL system) for the sake of simplicity. The odd field thus comprises the lines 1, 3, 5, .. . 575; the even field comprises the lines 2, 4, 6, ... 574.

FIG. 7 shows a first example in which the first row 21 of pixels is first written with information of the first picture line (+(1) of the odd field. The second row 22 is subsequently written with inverted information of the third picture line (−(3)), that is to say the second picture line of the odd field, the third row 23 is written with information of the fifth picture line (+(5)), that is to say the third picture line of the odd field, the fourth row 24 is written with inverted information of the seventh picture line (−(7)), etc. In this way 288 rows of pixels are first written with information of the odd field in the so-called half resolution mode. Subsequently the same rows 21, 22, 23, 24 are written with information of the even field which is now presented with opposite sign across the row of pixels (denoted by broken lines). This means that the first row 21 of pixels is read with inverted information of the second picture line (−(2)), that is to say the first picture line of the even field, the second row 22 is written with information of the fourth picture line (+(4)), that is to say the second picture line of the even field, etc.

In this way all pixels, considered with respect to time, receive the average information of two successive picture lines with the information of each picture line per picture period being also inverted. Thus row 21 shows the average of the first and second picture lines (1/2) and row 22 shows the average of the third and fourth picture lines (3/4), row 23 shows the average of the fifth and sixth picture lines (5/6), etc. (see FIG. 7). The minimum face flicker frequency is then 50 Hz (PAL) or 60 Hz (NTSC).

FIG. 8 shows how a device according to the invention can be similarly driven in full resolution mode. In this case 575 rows of pixels are read, while the information of one picture line (for example the third picture line) is presented in an inverted way to the second row 22 (−(3)) and is presented unchanged to the third row 23 (+(3)) of the pixels while simultaneously adapting selection voltages. The data voltage is presented inverted during half a line period while row 22 is selected and row 23 is not selected, and the other half of the line period it is presented unchanged while row 22 is no longer selected and row 23 is selected.

Similarly the information of the fifth picture line is presented inverted to row 24 (−5) and unchanged to row 25 (+5), etc. The lines of the even field are also presented to the rows 21, 22, 23, 24, 25 in an inverted form and in an unchanged form. In this way the average value of two picture lines is presented across 575 rows of pixels each time with an alternating sign of the voltage across the display element, more specifically the average value of the first and second picture lines across row 21 (1/2), of the second and third picture lines across row 22 (2/3), etc. (see FIG. 8). The rows are again entirely independent as regards selection so that any colour filter pattern can be used and the flicker is small (the face flicker frequency is again 50 Hz (60 Hz) due to this drive mode).

Figure 9:
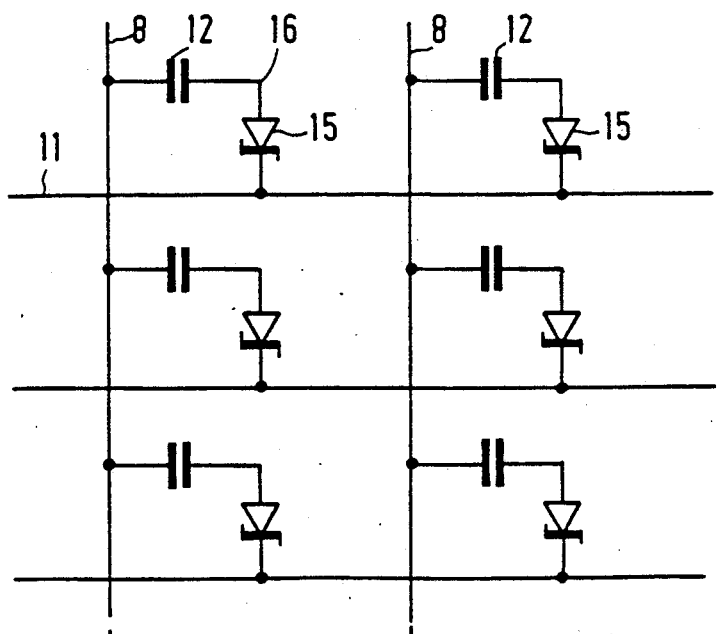
FIG. 9 shows an embodiment of a device according to the invention comprising Zener diodes.

FIG. 9 shows diagrammatically a device according to the invention in which the auxiliary voltage is obtained by using the Zener characteristic of a Zener diode 15. Pixels 12 arranged in a matrix are again present at crossings of row electrodes 11 and column electrodes 8 while the pixels 12 are connected to the row electrodes 11 via the Zener diodes 15.

Here again it holds for a drive around $V_c = \frac{1}{2}(V_{sat}+V_{th})$ that with data voltages $V_d(-\frac{1}{2}(V_{sat}-V_{th}) \leq V_d \leq \frac{1}{2}(V_{sat}-V_{th}))$ the voltage across the pixels 12 can be limited to the range between $V_{th}$ and $V_{sat}$. The associated selection voltages are again $V_{s1} = -V_{on} - \frac{1}{2}(V_{sat}+V_{th})$; $V_{s2} = -V_{on}\frac{1}{2}(V_{sat}+V_{th})$.

It also holds that in the case of non-selection at the point 16 the voltage must be such that there is no conductance through the Zener diode, neither in the forward direction nor as a Zener conductance.

In this case allowance must be made for the statistical behaviour of the Zener diodes used. This is shown diagrammatically in FIG. 10 in which the solid line shows a nominal current/voltage characteristic and the limitation of the spreading range is indicated by means of a broken line and a dot-and-dash line. $V_{zmin}$ is the highest admissible voltage at which the current for all possible characteristics is still sufficiently low to prevent discharge within a field period of a capacitor associated with a pixel. $V_{zmax}$ is the lowest voltage to cause the current passed through the Zener diode to be sufficiently large to negatively charge a pixel to at least $-V_{sat}$ within the reset period (for example 64/μsec).

Figure 10:
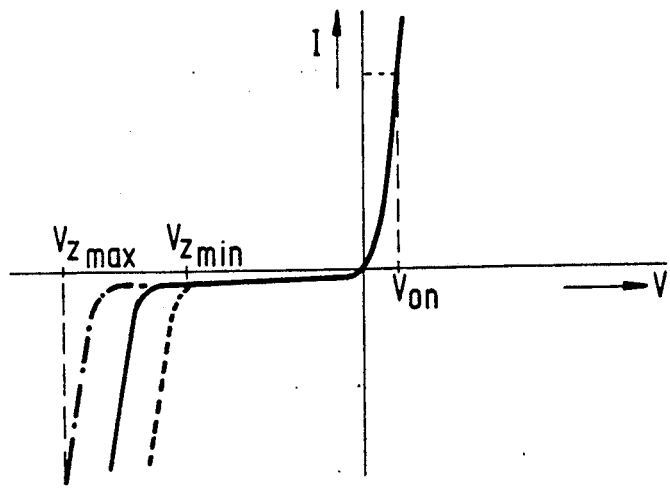
FIG. 10 shows the current-voltage characteristics associated with the Zener diodes.

For the lowest non-selection voltage ($V_{nsl}$) these conditions then lead for a voltage $V_A$ (junction 16) to $$V_{Amax} \leq V_{nsl}$$

and $$V_{Amin} \geq V_{nsl} - V_{Zmin}$$

in which $V_{Zmin}$ is the said maximum zener voltage of the zener diode 15 (see FIG. 10).

With $V_{Amin} = -V_{dmax} - V_{sat}$ and $V_{Amax} = V_{dmax} - V_{th}$ this leads (so-called negative selection) with $V_{dmax} = \frac{1}{2}(V_{sat} - V_{th})$ to $$V_{dmax} - V_{th} \leq V_{nsl} \leq V_{Amin} + V_{Zmin}, \text{ or} \qquad (6)$$

$$-\tfrac{1}{2}(V_{sat} - V_{th}) - V_{sat} + V_{Zmin} \geq V_{nsl} \geq \tfrac{1}{2}(V_{sat} - V_{th}) - V_{th},$$

for example $$V_{nsl} = \tfrac{1}{2}(V_{sat} - V_{th}) - V_{th}.$$

In the same manner these conditions for the highest non-selection voltage $V_{ns2}$ (positive selection) for which it holds that $$V_{Amin} = -V_{dmax} + V_{th} \text{ and } V_{Amax} = V_{dmax} + V_{sat} \text{ lead} \qquad (7)$$
to $$V_{dmax} + V_{sat} \leq V_{ns2} \leq -V_{dmax} + V_{th} + V_{Zmin} \text{ or}$$

$$-\tfrac{1}{2}(V_{sat} - V_{th}) + V_{th} + V_{Zmin} \geq V_{ns2} \geq \tfrac{1}{2}(V_{sat} + V_{th}) + V_{sat}$$

For example $$V_{nsl} = \tfrac{1}{2}(V_{sat} - V_{th}) + V_{sat}.$$

Addition of the left-hand and right-hand member of the equations (6) and (7) leads to $$-2(V_{sat} - V_{th}) + 2V_{Zmin} \geq 2(V_{sat} - V_{th}) \text{ ps}$$

or $$V_{Zmin} \geq 2(V_{sat} - V_{th}).$$

The possibility of using this device is therefore determined by the minimum Zener breakdown voltage and the maximum width of the transition range in the transmission/voltage characteristic (denoted by bracket 17 in FIG. 3) of the relevant liquid crystalline liquid or another electro-optical medium.

The maximum Zener breakdown must at least be provided in order to discharge the pixels to a voltage beyond or on the verge of the transmission range. For the reset voltage it therefore holds that $$V_{reset} = V_{Zmax} = \tfrac{1}{2}(V_{sat} - V_{th}) + V_{sat}.$$

The device of FIG. 9 can thus be driven with the same pattern of selection voltages as is shown in FIG. 5 in which it now holds that $$V_{s1} = -V_{on} - \tfrac{1}{2}(V_{sat} + V_{th});$$

$$V_{s2} = -V_{on} + \tfrac{1}{2}(V_{sat} + V_{th});$$

$$V_{ns1} = \tfrac{1}{2}(V_{sat} - V_{th}) - V_{th};$$

$$V_{ns2} = \tfrac{1}{2}(V_{sat} - V_{th}) + V_{sat};$$

$$V_{res} = V_{Zmax} + \tfrac{1}{2}(V_{sat} - V_{th}) + V_{sat}.$$

The invention is of course not limited to the embodiments shown, but several variations are possible within the scope of the invention.

In the device of FIGS. 4 and 6 non-linear switching elements other than diodes are possible such as, for example, bipolar transistors with short-circuited base-collector junctions or MOS transistors whose gate is short-circuit with the drain zone. There are also various possibilities for the diodes themselves. In addition to the diodes which are conventionally used in the technology for display devices, for example, a pn diode, Schottky diode or pin diode formed in monocrystalline, polycrystalline or amorphous silicon, CdSe or another semiconductor material may be considered, while the diodes may be formed both vertically and laterally.

Figure 11A:
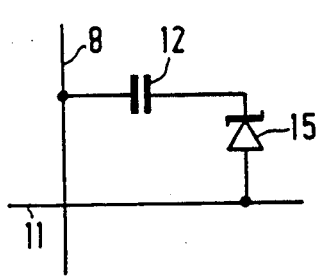
FIGS. 11a through 11c show a number of modifications of the device of FIG. 9.
Figure 11B:
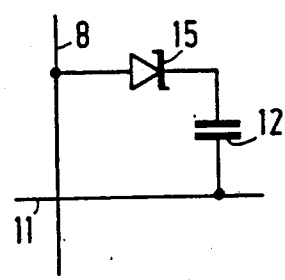
Figure 11C:
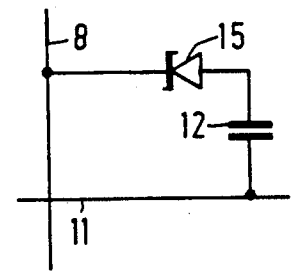

The Zener diode in the device of FIG. 9 may alternatively be arranged the other way around or it may be present between the column electrode 8 and the pixel 12 as is diagrammatically shown in FIG. 11. For such configurations similar expressions for the (non)-selection voltages, data voltages and reset voltage may be derived as for the device of FIG. 9, while the same voltage values of the drive signals apply for the device of FIG. 11b and the inverted voltage values apply for the circuits according to FIGS. 11a and 11c. In addition, the availability of a reset voltage renders the above-described device and method particularly suitable for use in a ferroelectric display medium as described in U.S. Pat. No. 4,840,462 in the name of the Applicant.

What is claimed is:

1. A display device comprising an electro-optical display medium between two supporting plates, a system of pixels arranged in rows and columns, with each pixel being formed by picture electrodes arranged on the facing surface of the supporting plates, and a system of row and column electrodes for presenting selection and data signals by means of which a range of voltages dependent on the electro-optical display medium can be presented across the pixels for the purpose of picture display, the device comprising means to apply, prior to selection, an auxiliary voltage across the pixels beyond or on the limit of the voltage range to be used for picture display characterized in that each picture electrode on one of the supporting plates is connected in an electrically conducting manner to the common point of two non-linear switching elements which are arranged in series between a column electrode for data signals and an auxiliary electrode.

2. A display device as claimed in claim 1, characterized in that the auxiliary voltage is beyond or on the limit of the range of transition in the transmission/voltage characteristic of the electro-optical medium.

3. A display device as claimed in claim 1, characterized in that the non-linear switching elements are diodes.

4. A display device as claimed in claim 1, characterized in that the auxiliary electrode is located between adjacent columns of picture electrodes and is common to such juxtaposed picture electrodes which are connected via a non-linear switching element to such electrode.

5. A display device as claimed in claim 1, characterized in that a Zener diode is arranged between a pixel and a row or column electrode.

6. A display device as claimed in claim 1, characterized in that the electro-optical medium comprises a liquid crystalline material.

7. A display device as claimed in claim 6, characterized in that the electro-optical medium comprises a ferro-electric liquid crystalline material.

8. A display device as claimed in claim 5, characterized in that the minimum Zener breakdown voltage is at least equal to twice the voltage range across which the electro-optical medium switches from the one to the other optical state.

9. Method of driving a display device comprising an electro-optical display medium between two supporting plates, a system of pixels arranged in rows and columns, with each pixel being formed by picture electrodes arranged on the facing surfaces of the supporting plates, and a system of row and column electrodes, in which at least during a part of a line period a row of pixels is selected via the row electrodes by means of non-linear switching elements in series with the pixels, while data signals are presented via the column electrode, and prior to presenting a data signal the pixels are charged or discharged to an auxiliary voltage beyond or on the limit of the range to be used for picture display, characterized in that during the same line selection period first the auxiliary voltage and subsequently the voltage to be used for display is presented across the pixels.

10. A method as claimed in claim 9, characterized in that the auxiliary voltage is beyond or on the limit of the transition range in the transmission/voltage characteristic of the electro-optical medium.

11. A method of driving a display device comprising an electro-optical display medium between two supporting plates, a system of pixels arranged in rows and columns, with each pixel being formed by picture electrodes arranged on the facing surfaces of the supporting plates, and a system of row and column electrodes in which at least during a part of a line period a row of pixels is selected via the row electrodes, while data signals are presented via the column electrode, characterized in that Zener diodes are arranged between the pixels and the row electrodes or the column electrodes and in that the pixels, prior to presenting a data signal are charged or discharged by means of the Zener characteristics of the Zener diode to a voltage beyond or on the limit of the range to be used for picture display.

12. A method as claimed in claim 11, characterized in that charging or discharging via the Zener characteristics and presenting the data signal are effected within one and the same line selection period for a row of pixels.

13. A method as claimed in claim 11, characterized in that charging or discharging via the Zener characteristics is effected during the line selection period preceding the line period in which a row of pixels is selected.

14. A method as claimed in claim 9, characterized in that the voltage across a row of pixels is presented with an inverted polarity with respect to the row of pixels which has just been written.

15. A method as claimed in claim 9, characterized in that the display device comprises a liquid crystalline material.

16. A method as claimed in claim 15, characterized in that the display device comprises a ferro-electric liquid crystalline material.

17. A display device as claimed in claim 3, characterized in that the auxiliary electrode is located between adjacent columns of picture electrodes and is common to such juxtaposed picture electrodes which are connected via a non-linear switching element to such electrode.

18. A display device as claimed in claim 2, characterized in that a Zener diode is arranged between a pixel and a row or column electrode.

19. A display device as claimed in claim 2, characterized in that the electro-optical medium comprises a liquid crystalline material.

20. A display device as claimed in claim 3, characterized in that the electro-optical medium comprises a liquid crystalline material.

21. A display device as claimed in claim 4, characterized in that the electro-optical medium comprises a liquid crystalline material.

22. A display device as claimed in claim 5, characterized in that the electro-optical medium comprises a liquid crystalline material.

23. Method of driving a display device comprising an electro-optical display medium between two supporting plates, a system of pixels arranged in rows and columns, with each pixel being formed by picture electrodes arranged on the facing surface of the supporting plates, and a system of row and column electrodes, in which at least during a part of a line period a row of pixels is selected via the row electrodes by means of non-linear switching elements in series with the pixels, while data signals are presented via the column electrode, and prior to presenting a data signal the pixels are charged or discharged to an auxiliary voltage beyond or on the limit of the range to be used for picture display, characterized in that the auxiliary voltage is presented during a line selection period preceding the line period in which selection takes place and data signals are presented for a row of pixels.

24. A method as claimed in claim 10, characterized in that the voltage across a row of pixels is presented with an inverted polarity with respect to the row of pixels which has just been written.

25. A method as claimed in claim 11, characterized in that the voltage across a row of pixels is presented with an inverted polarity with respect to the row of pixels which has just been written.

26. A method as claimed in claim 12, characterized in that the voltage across a row of pixels is presented with an inverted polarity with respect to the row of pixels which has just been written.

27. A method as claimed in claim 13, characterized in that the voltage across a row of pixels is presented with an inverted polarity with respect to the row pixels which has just been written.

28. A method as claimed in claim 10, characterized in that the display device comprises a liquid crystalline material.

29. A method as claimed in claim 11, characterized in that the display device comprises a liquid crystalline material.

30. A method as claimed in claim 12, characterized in that the display device comprises a liquid crystalline material.

31. A method as claimed in claim 13, characterized in that the display device comprises a liquid crystalline material.

32. A method as claimed in claim 14, characterized in that the display device comprises a liquid crystalline material.

33. A method as claimed in claim 23, characterized in that the voltage across a row of pixels is presented with an inverted polarity with respect to the row of pixels which has just been written.

34. A method as claimed in claim 23, characterized in that the display device comprises a liquid crystalline material.

35. A method as claimed in claim 34, characterized in that the display device comprises a ferro-electric liquid crystalline material.

* * * * *